United States Patent
Tsukamoto et al.

(10) Patent No.: US 6,858,763 B2
(45) Date of Patent: Feb. 22, 2005

(54) PROCESS FOR PREPARING ELASTOMERIC ETHYLENE-HEXAFLUOROPROPYLENE COPOLYMER

(75) Inventors: Mitsuo Tsukamoto, Settsu (JP); Masao Otsuka, Settsu (JP); Mitsuhiro Otani, Settsu (JP); Tatsuya Morikawa, Settsu (JP); Hideya Saito, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/381,677

(22) PCT Filed: Sep. 19, 2001

(86) PCT No.: PCT/JP01/08130

§ 371 (c)(1),
(2), (4) Date: Mar. 27, 2003

(87) PCT Pub. No.: WO02/31005

PCT Pub. Date: Apr. 18, 2002

(65) Prior Publication Data

US 2004/0214973 A1 Oct. 28, 2004

(30) Foreign Application Priority Data

Oct. 6, 2000 (JP) .................................. 2000-308068
Mar. 30, 2001 (JP) .................................. 2001-100317

(51) Int. Cl.$^7$ .................. C07C 17/266; C07C 21/18

(52) U.S. Cl. .................. 570/172; 570/171; 570/175; 570/257; 526/72; 526/89; 526/90; 526/91; 526/93

(58) Field of Search .................. 570/171, 172, 570/175, 257; 526/72, 89, 90, 91, 93

(56) References Cited

FOREIGN PATENT DOCUMENTS

| JP | 6-80728 A | | 3/1994 |
|---|---|---|---|
| JP | 06-080728 | * | 3/1994 |
| JP | 6-340716 A | | 12/1994 |
| JP | 9-77829 A | | 3/1997 |

OTHER PUBLICATIONS

English translation of International Preliminary Examination Report for PCT/JP01/08130 dated Aug. 5, 2002.
International Search Report for PCT/JP01/08130 dated Dec. 18, 2001.

* cited by examiner

Primary Examiner—Elvis O. Price
(74) Attorney, Agent, or Firm—Sughrue Mion, PLLC

(57) ABSTRACT

The present invention relates to a process for preparing an elastomeric ethylene-hexafluoropropylene copolymer with excellent vulcanization properties, which comprises emulsion polymerizing ethylene, hexafluoropropylene and when in demand, a monomer copolymerizable therewith in a aqueous medium at a low temperature of −20° C. to 40° C. using a radical polymerization initiator.

9 Claims, No Drawings

PROCESS FOR PREPARING ELASTOMERIC ETHYLENE-HEXAFLUOROPROPYLENE COPOLYMER

TECHNICAL FIELD

The present invention relates to a process for preparing an elastomeric E-HFP copolymer, with ethylene (E) and hexafluoropropylene (HFP) as fundamental monomers, efficiently at a low temperature with a stable composition.

The vulcanizate obtained by vulcanizing a vulcanizable composition obtained by using this elastomeric E-HFP copolymer is excellent in amine resistance and is suitable as material for oil seal for automobile oil, especially engine oil, mission oil and differential oil.

BACKGROUND ART

The elastomeric copolymer of ethylene (E) and hexafluoropropylene (HFP) is excellent in heat resistance, oil resistance and chemical resistance (particularly alkali resistance), just as other fluorine resin and elastomers are.

Because the copolymerizability of ethylene and hexafluoropropylene is extremely low and the copolymerization reaction does not proceed in moderate polymerization conditions, copolymerization has been conducted under severe polymerization conditions of high pressure or using radiation in the past.

For example, in J. Polym. Sci. A, 12, page 627 (1974), copolymerization is conducted in a high pressure of 4.9 MPaG (50 kgf/cm$^2$G) by irradiating with radiation at ambient temperature. However, using radiation requires special facilities and is not suitable in terms of safety.

The method of copolymerizing ethylene and HFP at a high temperature and high pressure (650 kg/cm$^2$ to 2,000 kg/cm$^2$, 115 to 200° C.) batchwise or continuously is disclosed in the Journal of the Chemical Society of Japan, 1980, (1), p 112 to 120. However, though the vulcanization properties of the obtained copolymer are excellent, the polymerization method is not emulsion polymerization. In addition, as mentioned before, because the reaction conditions are extremely harsh, there is the problem of an increase in the building costs of the production facilities.

U.S. Pat. No. 4,039,595 describes conducting copolymerization at a low temperature of 30° C. at 3.76 MPaG (545 psiG) using a polymerization initiator such as diisopropyl peroxydicarbonate. However, the polymerization method is suspension polymerization and the obtained copolymer is a low molecular weight substance without elastomeric properties.

WO 94/24175 pamphlet describes copolymerizing ethylene, HFP and tetrafluoroethylene (TFE) at 50° C. under high pressure of 3.43 MPaG (35 kgf/cm$^2$G) using ammonium persulfate as a polymerization initiator. However, the polymerization rate is low and the obtained copolymer has many branches and is inferior in processability.

Furthermore, as a method for preparing a fluorine-containing elastomer by copolymerizing at a low temperature, JP-A-56-163105 describes redox polymerization using water soluble persulfate and a reducing agent comprising hydroxymethane sulfinate and ethylenediaminetetraacetic acid or a salt thereof. However, there are no descriptions mentioning E-HFP copolymers or the increase in vulcanization properties by lowering the polymerization temperature.

The present invention aims to provide a process for preparing an elastomeric E-HFP copolymer with few branches, large molecular weight and excellent vulcanization properties.

DISCLOSURE OF INVENTION

The present invention relates to a process for preparing an elastomeric ethylene-hexafluoropropylene copolymer which comprises emulsion-polymerizing ethylene (E), hexafluoropropylene (HFP), and when in demand, a monomer copolymerizable therewith in an aqueous medium at −20° C. to 40° C. using a radical polymerization initiator.

The radical polymerization initiator may be used independently, but it is preferable that copolymerization is conducted in the presence of a redox-type initiator by using a radical polymerization initiator and a reducing agent comprising metal ion, hydroxymethane sulfinate and ethylenediaminetetraacetic or a salt thereof.

As the radical polymerization initiator, organic peroxide or persulfate may be used suitably.

As the organic peroxide, peroxyesters such as t-butyl peroxypivalate are preferable.

Furthermore, emulsion polymerization can be conducted under a relatively low polymerization pressure of 0.49 to 10 MPaG.

BEST MODE FOR CARRYING OUT THE INVENTION

In the present invention, the copolymerization ratio (mole ratio) of the monomers, E/HFP, is 90/10 to 50/50, more preferably 70/30 to 50/50. The monomers may be copolymerized so that the amount of the other monomers copolymerizable therewith is 0 to 15% by mole, more preferably 0 to 10% by mole.

Examples of the monomers copolymerizable with ethylene and HFP are tetrafluoroethylene (TFE), vinylidene fluoride (VdF), chlorotrifluoroethylene (CTFE), trifluoroethylene, pentafluoropropylene and perfluoro(alkyl vinyl ether) (PAVE), or at least two members of the monomers. TFE and CTFE are particularly preferable from the viewpoint that productivity can be improved. However, it is necessary for the obtained copolymer to have elastomeric properties.

The radical polymerization initiator used in the present invention is important in increasing the polymerization reaction rate at a low temperature. As the radical polymerization initiator, organic peroxide, persulfate or a redox type initiator which is a combination of these with a reducing agent is suitable.

Examples of organic peroxides include peroxyesters such as 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutyl peroxy2-ethylhexanoate, 2,5-dimethyl-2,5-bis(2-ethylhexanoylperoxy)hexane, 1-cyclohexyl-1-methylethyl peroxy2-ethylhexanoate, t-hexyl peroxy2-ethylhexanoate, t-butyl peroxy2-ethylhexanoate, t-butyl peroxyisobutylate, t-hexyl peroxyisopropyl monocarbonate, t-butyl peroxy3,5,5-trimethylhexanoate, t-butyl peroxylaurate, t-butyl peroxyisopropylmonocarbonate, t-butyl peroxy2-ethylhexylmonocarbonate, t-butyl peroxyacetate, t-butyl peroxybenzoate, and cumyl peroxyneodecanoate; dialkylperoxides such as 2,5-dimethyl-2,5-bis(t-butylperoxy)hexane, di-t-butyl peroxide; diacylperoxides such as isobutyryl peroxide, 3,5,5-trimethylhexanoyl peroxide, octanoyl peroxide, lauroyl peroxide, stearoyl peroxide and succinic acid peroxide; peroxy dicarbonates such as dinormalpropyl peroxydicarbonate, diisopropyl peroxydicarbonate, bis(4-t-butylcyclohexyl)peroxy dicarbonate, di-2-ethoxyethyl peroxydicarbonate, di-2-ethylhexyl peroxydicarbonate and di-2-methoxybutyl peroxydicarbonate; hydroperoxide such as p-methane hydroperoxide, diisopropylbenzene hydroperoxide, 1,1,3,3-tetramethylbutyl hydroperoxide, cumene hydroperoxide, t-hexyl hydroperoxide and t-butyl hydroperoxide;

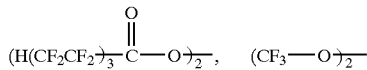

and the like.

Of these, peroxyesters, especially t-butyl peroxypivalate, are preferable from the viewpoint that polymerization rate is high and the molecular weight of the obtained copolymer is high.

Examples of the persulfate are ammonium salt such as ammonium persulfate and alkali metal salt such as sodium persulfate, potassium persulfate and the like. Of these, from the viewpoint of high water solubility, ammonium persulfate is preferable.

Examples of the reducing agents, which form a redox type initiator when used in combination with these, are metal ion, hydroxymethane sulfinate, ethylenediaminetetraacetic acid (EDTA), a salt thereof, water-soluble thiosulfate, sulfite and the like.

Examples of the metal ion are ions of iron, copper, silver, cerium, cobalt and nickel. These are supplied in the form of sulfite, chloride, ammonium sulfate, nitrate and the like.

Ethylenediaminetetraacetic acid (EDTA) may be used in an isolated form but more preferably is used in the form of disodium salt.

An example of an especially preferable redox type initiator is a combination using a peroxyester or persulfate as the radical polymerization initiator and iron ion (iron sulfate), EDTA (or a salt thereof) and hydroxymethane sulfinate as the reducing agent. Of these, the combination using t-butylperoxypivalate (radical polymerization initiator), iron ion (iron sulfate), EDTA (or a salt thereof) and hydroxymethane sulfinate is most preferable form the viewpoint that the polymerization reaction rate is high at a low temperature and the molecular weight can be easily adjusted.

The proportion of the radical polymerization initiator and the reducing agent is preferably 1 to 100 mmol/l (concentration in aqueous medium within the emulsion polymerization system; same below), particularly 5 to 50 mmol/l of the radical polymerization initiator, 0.005 to 5 mmol/l, particularly 0.01 to 1 mmol/l of metal ion (metal salt, particularly iron salt), 0.005 to 5 mmol/l, particularly 0.01 to 1 mmol/l of EDTA and 0.5 to 100 mmol/l, particularly 5 to 50 mmol/l of hydroxymethane sulfinate.

By changing the charging amount and ratio of metal (iron) ion and EDTA, the polymerization reaction speed and the molecular weight of the obtained copolymer can be controlled.

The amount of radical polymerization initiator is 0.001 to 5% by weight, preferably 0.01 to 5% by weight based on the total amount of monomers. The amount of the redox type initiator is determined in relation to the amount of the radical polymerization initiator within the above range. When the amount of the radical polymerization initiator is large, the molecular weight becomes small, and the obtained copolymer is not elastomeric.

A characteristic and the biggest effect of the present invention lies in the improvement of vulcanization properties of the elastomer generated by radical emulsion polymerization at a low temperature of −20° C. to 40° C., more preferably 5° C. to 35° C. Polymerization can be conducted at a polymerization temperature which exceeds 40° C., but this range is not included in the present invention as the vulcanization properties decrease. In addition, too low a temperature is not preferable because the polymerization rate becomes low.

The emulsion polymerization of the present invention can be conducted under a relatively low polymerization pressure. Usually a pressure of at most 10 MPa, preferably at least 0.49 MPa, more preferably approximartely 0.49 to 3 MPa is employed. Emulsion polymerization progresses even when the polymerization pressure is high, but this is a disadvantage because production facility costs increase.

The emulsion polymerization of the present invention is conducted by emulsifying the aforesaid monomer and radical polymerization initiator (or redox type initiator) within an aqueous medium. Emulsification of a monomer is usually conducted using an emulsifier. The emulsifier used for emulsion polymerization for obtaining E-HFP copolymer can be employed. Examples of the emulsifier are fluorine type emulsifiers such as perfluoro ammonium octanate, perfluoro ammonium nonate and $F(CF(CF_3)CF_2O)_nCF(CF_3)COONH_4$ (n=1 to 4). Of these, a flourine type emulsifier such as perfluoro ammonium octanate is preferable from the viewpoint that polymerization rate is high. The amount used is 0.0001 to 15% by weight, more preferably 0.1 to 30% by weight based on the aqueous medium.

Other additives usually used in emulsion polymerization may be used according to need. For example, the polymerization system is preferably neutral or slightly alkali with a pH of approximately 7 to 10 in view of increasing the polymerization reaction rate. In order to adjust the pH, pH control agents such as sodium hydroxide, potassium hydroxide, ammonium hydroxide and sodium hydrogen phosphate may be added. Furthermore, water-soluble organic solvents such as methanol, t-butanol and methyl acetate may be used in order to advance the polymerization reaction rate.

Though the polymerization time differs according to the type of monomer used, the type and amount of the radical polymerization initiator used, the desired molecular weight of the copolymer, the composition of the copolymer and the like, a range of 1 to 100 hours is appropriate.

The E-HFP copolymer obtained in this way has elastomeric properties and few branches, and is therefore excellent in processability.

A vulcanizate obtained by vulcanizing this elastomeric E-HFP copolymer using a vulcanizer is excellent in vulcanization properties, especially strength at break, elongation at break and heat resistance.

The methods of peroxide vulcanization and radiation vulcanization may be employed for vulcanizing the elastomer obtained by the present invention.

As the peroxide used as vulcanizing agent in peroxide vulcanization, organic peroxide which easily generates peroxy radical by heat or in the presence of an oxidation reducing agent is preferably used. Examples thereof include 1,1-bis(t-butylperoxy)-3,3,5-trimethylcyclohexane, 2,5-dimethylhexane-2,5-dihydroperoxide, di-t-butyl peroxide, t-butylcumyl peroxide, dicumyl peroxide, 2,5-dimethyl-2,5-bis(t-butylperoxy)hexane, α,α-bis(t-butylperoxy)-p-diisopropyl benzene, 2,5-dimethyl-2,5-di(t-butylperoxy)-hexyne-3, benzoyl peroxide, t-butyl peroxybenzene, t-butyl peroxybenzoate, 2,5-dimethyl-2,5-di(benzoylperoxy)hexane, t-butyl peroxymaleic acid, t-butyl peroxyisopropylcarbonate, 1,1-bis(t-butylperoxy)2-methylcyclohexane, 1,1-bis(t-hexylperoxy)cyclohexane, 1,1-bis(t-butylperoxy) 3,3,5-triethylcyclohexane, 1,1-bis(t-butylperoxy)cyclohexane, 1,1-bis(t-butylperoxy) cyclododecane, t-hexyl peroxybenzoate, t-butyl peroxyacetate, 2-2-bis(t-butylperoxy)butane, n-butyl-4,4-bis(t-butylperoxy)pentanoic acid, di-t-butyl peroxyisophthalate, 2,5-diethyl-2,5-di(benzoylperoxy) hexane and the like. Of these, dialkyl type and peroxy ester type, in particular t-butyl peroxybenzoate and dicumyl peroxide are preferable.

The amount of the vulcanizing agent can be accordingly determined with consideration to the amount of active —O—O— bonds within the organic peroxide and decomposition temperature, and is generally 0.5 to 10 parts, preferably 1.0 to 5 parts based on 100 parts of the copolymer.

In peroxide vulcanization, hardening (vulcanization) advances significantly by using an auxiliary vulcanizing agent. Examples of the auxiliary vulcanizing agent are those which have been used conventionally such as triallyl cyanurate, triallyl isocyanurate, triallyl formal, triallyl trimellitate, N,N'-m-phenylene bismaleimide, dipropargyl terephthalate, diallyl phthalate, tetraallylterephthalate amide, triallyl phosphate and the like. Of these, triallyl isocyanurate is preferable. The amount used is generally 0.2 to 10 parts, preferably 0.5 to 5 parts based on 100 parts of the copolymer.

Peroxide vulcanization may be conducted in the conventional manner. For example, there is the method of putting, into a die, the copolymer obtained by the present invention, a vulcanizing agent and when necessary, an auxiliary vulcanizing agent and any other additive which can be compounded accordingly after roll mixing and raising the pressure to carry out primary vulcanization, and then secondary vulcanization. Usually, the conditions adopted for primary vulcanization are within the ranges of 100° C. to 200° C. in temperature, 5 to 60 minutes in time and 2 to 10 MPa in pressure. The conditions adopted for secondary vulcanization are within the ranges of 150° C. to 300° C. in temperature and 30 minutes to 30 hours in time.

To the composition comprising the copolymer obtained by the present invention, a filler, a processing aid or an antioxidant may be added according to need.

Examples of the filler are metal oxide such as magnesium oxide, calcium oxide, zinc oxide, lead oxide, titanium oxide, iron oxide, silver oxide, chromium oxide, bismuth oxide, silicon oxide, aluminum oxide and copper oxide, metal hydroxide such as magnesium hydroxide, aluminum hydroxide and calcium hydroxide, carbonate such as magnesium carbonate, aluminum carbonate, calcium carbonate and barium carbonate, metal sulfide such as molybdenum disulfide, iron sulfide and copper sulfide, sulfate such as calcium sulfate, aluminum sulfate and barium sulfate and silicate such as magnesium silicate, calcium silicate, sodium silicate and aluminum silicate. Other examples are hydrotalcite, lithopone (a mixture of zinc sulfide and barium sulfate), graphite, carbon black, lampblack, carbon fluoride, calcium fluoride, coke, fluorine resin powder or fiber and carbon fiber.

Chromium oxide, silicon oxide and iron oxide powder which are inorganic powder with a Mohs hardness of at least 6, which are described in JP-A-8-27343 and JP-A-8-151565; polytetrafluoroethylene powder pierced with carbon described in JP-A-7-188500; a fiber prepared with a material having a fluorine resin to which a filler is added as the main component which is described in JP-A-56-151739; a fiber of a material having carbon fiber and fluorine resin as the main component; and calcium metasilicate or graphite which is described in JP-B-5-64177 are preferable from the viewpoint of particularly contributing to the improvement of abrasion resistance, metal adhesion and lubricating properties. Furthermore, carbon black and silicon oxide are preferable from the viewpoint of significant improvement in mechanical strength and permanent compression strain.

Examples of the processing aid are higher fatty acids such as stearic acid, oleic acid, palmitic acid and lauric acid, higher fatty acid salts such as sodium stearate and zinc stearate, higher fatty acid amides such as stearic acid amide and oleic acid amide, higher fatty acid esters such as ethyl stearate, butyl stearate, ethyl oleate and butyl oleate, higher fatty acid amines such as stearic acid amine, polyols such as ethylene glycol, glycerine and diethylene glycol, aliphatic hydrocarbons such as vaseline and paraffin and others such as petroleum wax, silicone oil, low molecular weight polyethylene and low molecular weight polypropylene.

Examples of antioxidants are 4,4-bis($\alpha$,$\alpha$-dimethylbenzyl)diphenylamine, phenyl-1-naphthylamine, alkylated diphenylamine, octylated diphenylamine, p-p (toluenesulfonylamide)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine), N-phenyl-N'-(3-methacryloyloxy-2-hydroxypropyl)-p-phenylenediamine, 2,2,4-trimethyl-1,2-dihydroquinoline polymer and tris (nonylpheny)phosphite.

When radiation vulcanization is employed, an auxiliary vulcanizing agent, filler, processing aid and antioxidant may be added to vulcanize as in peroxide vulcanization.

The vulcanizable composition in which the elastomer obtained by the process of the present invention is used may be molded into molded articles such as a sheet, pipe, rod, tube, angle, channel, cloth product and coated board by continuous molding such as extrusion, transfer, calender, roll coat, brushing and impregnation in addition to the usual molding using a die. The composition may also be molded into profiles and molded articles of a special shape such as spongy rubber, by other known molding methods. Also, the composition may be primarily processed into film or tape and then further molded by secondary processing such as laminating, attaching, and wrapping. The composition molded in this manner is vulcanized by the aforementioned vulcanizing measures. In addition, a vulcanization coating can be formed by vulcanizing after applying the composition to the surface of the base material in the state of a solution by coating, impregnating or spraying; by vulcanization adhesion by laminating the vulcanizable composition in a state of film or sheet; or by adhesion laminating the vulcanized film or sheet to the surface of the base material and thus various vulcanized rubber products can be provided.

The vulcanizate obtained in this way has excellent heat resistance, oil resistance, amine resistance and chemical resistance and can be used for various parts in the automobile, aviation, semiconductor, food and chemical industries. Utilizing the heat resistance, oil resistance and amine resistance, the composition is suitable for oil seal or oil seal parts such as a hose for the engine oil of an automobile. Other favorable molded articles are listed below.

Applications of Molded Articles:

Packing, O-ring, hose, other sealing materials, diaphragm valve and wire covering material for amine resistance, oil resistance, chemical resistance, steam resistance and weather resistance in transportation means such as automobile, ship and airplane; similar packing, O-ring, sealing material, diaphragm, valve, hose, roll and tube in chemical plant; similar packing, O-ring, hose, sealing material, belt, diaphragm, valve, roll and tube in foods plant and foods processing machine (including domestic appliances); similar packing, O-ring, hose, sealing material, diaphragm, valve and tube in nuclear plant; similar packing, O-ring, hose, sealing material, diaphragm, valve, roll, tube, mandrel, wire covering material, flexible joint, belt, rubber plate and weather strip in general industrial parts; roll blade for PPC copying machine, etc.

More concretely there are the following applications.

(i) Automotive Applications

The elastomer obtained by the present invention exhibits superior heat resistance and resistance against amine type additive (more specifically succinate imides and metal dialkyl dicarbamates) which are mainly added to automobile oil. In addition, because the volume change is small in relation to the oil, the elastomer is suitable as various parts and molded articles for automobile oil, such as automatic transmission fluid (ATF), engine oil and differential gear oil. More specifically, the elastomer is suitable as material for an elastomer molded article which may possibly come into contact with oil such as sealing material or hose material for engine oil of gasoline and diesel powered vehicles, sealing material or hose material for various transmission oil; sealing material or hose material for various gear oil and coating material for sensor lines to detect oil environment.

More Specifically, (1) For sealing
  Crank shaft seal
  O-ring and gasket for engine cylinder sleeve
  O-ring and gasket for wet cylinder sleeve
  Power piston packing
  Cylinder liner seal
  Valve stem seal
  Front pump seal for automatic transmission
  Rear axle pinion seal
  Gasket for universal joint
  Pinion seal for speed meter
  Piston cup for foot brake
  O-ring and oil seal for torque transmission
  Seal for after-burner for exhaust gas
  Bearing seal
  Differential seal (drive pinion seal, side seal)
  Differential gasket and O-ring
  Oil seal, gasket, O-ring and packing for manual transmission
  Oil seal, gasket, O-ring and packing for automatic transmission
  Oil seal, gasket, O-ring and packing for gearless transmission (belt type or toroidal type)
  Wheel bearing seal
  Seal, gasket and O-ring for radiator
  Seal, gasket and O-ring for oil cooler
  Seal, gasket and O-ring for power steering
(2) For hose
  Oil hose for manual transmission
  ATF hose for automatic transmission
  CVTF hose for gearless transmission (belt type or toroidal type)
  EGR tube
  Twin-carburetor tube
  Hose for radiator
  Hose for oil cooler
  Hose for power steering
(3) For diaphragm
  Diaphragm for sensor of carburetor
(4) For electrical components
  Wire covering material
  Insulating material
  Sheathe
  Cooler hose
  Tube
  Ring
  Packing
(5) Other applications
  Vibration proof rubber (engine mount, exhaust system, etc.)
  Hose for after burner (ii) Applications in Chemical Industries (1) For sealing
  Seals for pump, flow meter and pipe for chemicals
  Seal for heat exchanger
  Packing of glass cooler for sulfuric acid manufacturing equipment
  Seals for sprinkler and transfer pump for agricultural chemicals
  Seal for gas pipe
  Seal for plating solution
  Packing for high temperature vacuum dryer
  Roll seal of belt for paper making
  Seal for fuel battery
  Joint seal for air duct
(2) For roll
  Roll having trichlene resistance (for dyeing of fiber)
(3) Other applications
  Acid resistant hose (for concentrated sulfuric acid)
  Packing for joint of tubes for gas chromatograph and pH meter
  Chlorine gas transfer hose
  Rainwater drain hoses for benzene and toluene reservoir tanks
  Seal, tube, diaphragm and valve parts for analyzer and physical and chemical appliances
  Steam hose (iii) Applications for Industrial Machinery (1) For sealing
  Seals for hydraulic and lubricating machine
  Bearing seal
  Seal for dry copying machine
  Seals for window, etc. of dry cleaner
  Seal for equipment for concentrating uranium hexafluoride
  Seal (vacuum) valve for cyclotron
  Seal for automatic packaging machine
(2) Other applications
  Rolls, scraper, tube and valve parts for printing equipment
  Rolls, scraper, tube and valve parts for coating equipment
  Ink tube, roll and belt for printer
  Belt and rolls for dry copying machine Diaphragms for pumps for analyzing sulfurous acid gas and chlorine gas in the air (environmental pollution-related meters)

Rolls and belt for printer

Squeeze rolls for pickling

Pipe, hose and flexible joint for dry-cleaning machine (iv) Airplane Applications Valve stem seal for jet engine Fuel feeding hose, gasket and O-ring Rotating shaft seal Gasket for hydraulic equipment Seal for fire wall (v) Ship Applications Stern seal for screw propeller shaft Suction and exhaust valve stem seals for diesel engine Valve seal for butterfly valve Stem seal for butterfly valve (vi) Food and Medicine Applications Seal for plate heat exchanger Solenoid valve seal for vending machine Plugs for chemicals Rubber material for food processing machine (for example sealing material such as a gasket, diaphragm and O-ring for an heat exchanger, pipe, hose, sanitary packing, valve packing and filler packing used as a joint between the mouth of the bottle and the filler when filling)

Packing, gasket, tube, diaphragm, hose and joint sleeve for filling device, sterilizing device and brewing device of alcoholic and carbonated beverage products, water heater and various automatic food vending machines (vii) Electrical Applications Insulation oil cap for a train of the Shinkansen line Venting seal for liquid ring transmission Jacket for oil well cable Electric insulating material (for example material used for insulating spacer for various electric appliances and insulating tape and heat contracting tube which is used for the joint and terminal part of cables)

Material for electronic and electric devices used in a high temperature atmosphere (for example lead wire material for motor, wire material for high heat oven)

Further the molded article of the present invention can be used for O-ring, sealing material, hose, tube, diaphragm, roll, lining and coating in equipment for producing semiconductor, liquid crystal panel, plasma display panel, plasma address liquid crystal panel, field emission display panel, substrate for solar battery, etc., for example, CVD equipment, etching equipment, oxidation/diffusion equipment, sputtering equipment, ashing equipment, ion implantation equipment, exhausting equipment, and the like which require plasma resistance; O-ring, sealing material, hose, tube, diaphragm and roll in wet etcher, cleaning equipment, pipes for chemicals, gas pipes, and the like which require chemical resistance; and further O-ring, sealing material, hose, tube, diaphragm and roll to be used on parts of the mentioned equipment which are required to be free from dust and metal.

Examples of other applications where chemical resistance is required are O-ring, sealing material, hose, tube, diaphragm of pump for resist developing solution, releasing solution and wafer cleaning solution and wafer transferring rolls in production equipment for semiconductor, liquid crystal panel, plasma display panel, etc.

Furthermore, there are other examples of using by forming a vulcanization covering as mentioned before. More specifically, examples are listed below.

Non-adhesive oil resistant roll for copying machine

Weather strip for weather resistance and freeze prevention

Rubber plug for fluid infusion

Vial rubber plug

Mold-releasing agent

Non-adhesive carrier belt

Adhesion preventing covering for the pre gasket of the automobile engine mount

Coating of synthetic fiber

Bolt member or joint having thin layer of coating of packing

Hereinafter, the present invention is explained in detail by means of examples, but is not limited thereto.

EXAMPLE 1

A 100 ml stainless steel autoclave was charged with 45 ml of ion exchanged water, 42.5 g of ammonium perfluorooctanate, 0.04 g of sodium hydroxide, 0.4 g of hydrogen phosphate disodium salt 12 hydrate, 1.84 g of t-butyl alcohol and 0.13 g of Perbutyl PV (containing 70% by weight of t-butyl peroxy pivalate, available from NOF Corporation). After sufficiently replacing with nitrogen, the autoclave was charged with 16.7 g of hexafluoropropylene (HFP) and then 2.02 g of ethylene in a vacuum state. The autoclave was placed into a constant temperature water bath shaker of 15° C. and was shaken until the pressure became constant (1.6 MPaG). When the pressure became constant, the autoclave was charged with an aqueous solution containing 0.0031 g of iron (II) sulfate 7 hydrate, 0.0041 g of disodium ethylene diamine tetraacetate 2 hydrate and 0.1 g of sodium hydroxymethane sulfinate 2 hydrate by a plunger pump to start the reaction. The reaction was conducted at 15° C. for 15 hours.

After the reaction was finished, the remaining monomers were released into the air and the obtained emulsified dispersion body was coagulated with hydrochloric acid, then washed with ion exchanged water and dried at 120° C. until a constant weight was reached to obtain 9.9 g of the elastomeric polymer product. The average polymerization rate was 13.2 g/hr/liter-water.

The composition of copolymer, number average molecular weight and weight average molecular weight of the product obtained by the polymerization were measured by the analyzing method of $^1$H-NMR and GPC. The product was a copolymer of 56.7% by mole of ethylene and 43.3% by mole of HFP, the number average molecular weight was $4.63 \times 10^4$ (on a polystyrene basis), and the weight average molecular weight was $1.14 \times 10^5$.

EXAMPLES 2 TO 11

E-HFP copolymer was obtained by emulsion polymerizing ethylene and HFP in the same manner as in Example 1 except that the radical polymerization initiators indicated in Table 1 in the amounts indicated in Table 1 were used instead of Perbutyl PV (containing 70% by weight of t-butyl peroxypivalate, available from NOF Corporation).

The amount of the copolymer obtained, the average polymerization rate, the composition of copolymer, the number average molecular weight and the weight average molecular weight in these Examples are indicated in Table 1.

The radical polymerization initiators used are as follows.
Perbutyl PV: containing 70% by weight of t-butyl peroxypivalate, available from NOF Corporation.
Perbutyl L: containing 90% by weight of t-butyl peroxylaurate, available from NOF Corporation.
Perbutyl Z: containing 98% by weight of t-butyl peroxybenzoate, available from NOF Corporation.
Perbutyl A: containing 50% by weight of t-butyl peroxyacetate, available from NOF Corporation.
Perbutyl ND: containing 70% by weight of t-butyl peroxyneodecanoate, available from NOF Corporation.
Percumyl ND: containing 70% by weight of cumyl peroxyneodecanoate, available from NOF Corporation.
Perhexyl ND: containing 70% by weight of t-hexyl peroxyneodecanoate, available from NOF Corporation.
Perocta ND: containing 70% by weight of 1,1,3,3-tetramethylbutyl peroxyneodecanoate, available from NOF Corporation.
Perbutyl IB: containing 74% by weight of t-butyl peroxyisobutylate, available from NOF Corporation.
Perloyl IB: containing 25% by weight of isobutyrylperoxide, available from NOF Corporation.

product obtained by the polymerization were measured by the analyzing method of $^1$H-NMR and GPC. The product was a copolymer of 63.2% by mole of ethylene and 36.8% by mole of HFP, the number average molecular weight was $2.20 \times 10^5$ (on a polystyrene basis), and the weight average molecular weight was $9.49 \times 10^5$.

EXAMPLE 13

A 6 l stainless steel autoclave was charged with 3 l of ion exchanged water, 150 g of ammonium perfluorooctanate, 2.4 g of sodium hydroxide, 24 g of hydrogen phosphate disodium salt 12 hydrate, 110.4 g of t-butyl alcohol and 7.8 g of Perbutyl PV (containing 70% by weight of t-butyl peroxypivalate, available from NOF Corporation). After sufficiently replacing with nitrogen, the autoclave was charged with 1,640 g of hexafluoropropylene (HFP) and then 201 g of ethylene in a vacuum state. The autoclave was cooled and left until the temperature became 15° C. and the pressure became constant (2.1 MPaG) while stirring the polymerization system with an electromagnetic stirrer. When the temperature and pressure became constant, the autoclave was charged with an aqueous solution containing

TABLE 1

| | Radical polymerization initiator | | Average polymerization rate (g/hr/liter-water) | Amount of copolymer obtained (g) | Average molecular weight ($\times 10^4$) | | Composition of copolymer (E/HFP, % by mole) |
|---|---|---|---|---|---|---|---|
| | Type | Amount charged (g) | | | Number average | Weight average | |
| Ex. 1 | Perbutyl PV | 0.13 | 13.2 | 9.9 | 4.63 | 11.4 | 56.7/43.3 |
| Ex. 2 | Perbutyl L | 0.16 | 10.2 | 7.6 | 3.98 | 8.49 | 58.0/42.0 |
| Ex. 3 | Perbutyl Z | 0.10 | 6.2 | 4.6 | 3.56 | 7.28 | 58.8/41.2 |
| Ex. 4 | Perbutyl A | 0.14 | 6.9 | 5.1 | 3.58 | 7.06 | 59.1/40.9 |
| Ex. 5 | Perbutyl ND | 0.18 | 10.6 | 7.9 | 4.74 | 10.1 | 58.5/41.5 |
| Ex. 6 | Percumyl ND | 0.23 | 9.4 | 7.0 | 3.80 | 7.69 | 58.4/41.6 |
| Ex. 7 | Perhexyl ND | 0.20 | 11.0 | 8.3 | 4.06 | 8.49 | 57.8/42.2 |
| Ex. 8 | Perocta ND | 0.23 | 9.8 | 7.3 | 4.40 | 9.44 | 58.1/41.9 |
| Ex. 9 | Perbutyl IB | 0.11 | 8.7 | 6.5 | 3.54 | 6.98 | 58.3/41.7 |
| Ex. 10 | Perloyl IB | 0.38 | 5.2 | 3.9 | 3.63 | 6.94 | 59.0/41.0 |
| Ex. 11 | Ammonium persulfate | 0.1568 | 6.6 | 5.0 | 6.50 | 17.1 | 58.8/41.2 |

EXAMPLE 12

A 3 l stainless steel autoclave was charged with 1,500 ml of ion exchanged water, 16.7 g of ammonium persulfate. After sufficiently replacing with nitrogen, the autoclave was charged with 822 g of hexafluoropropylene (HFP) and then 103 g of ethylene in a vacuum state. The autoclave was cooled and left until the temperature was 15° C. and the pressure became constant (2.2 MPaG) while stirring the polymerization system with an electromagnetic stirrer. The autoclave was then charged with a 10% aqueous solution of sodium sulfite so that the ratio became 6 g/hr by a plunger pump to start the reaction. The pressure decreases as the reaction progresses and this decrease in pressure was compensated by adding ethylene. The polymerization reaction was conducted at a constant temperature and pressure (15° C., 2.2 MPaG) for 29.5 hours.

After the reaction was finished, the remaining monomers were released into the air and the obtained emulsified dispersion body was coagulated with hydrochloric acid, then washed with ion exchanged water and dried at 120° C. until a constant weight was reached to obtain 150 g of the elastomeric polymer product. The average polymerization rate was 2.7 g/hr/liter-water.

The composition of copolymer, number average molecular weight and weight average molecular weight of the 0.186 g of iron (II) sulfate 7 hydrate, 0.249 g of disodium ethylene diamine tetraacetate 2 hydrate and 6.0 g of sodium hydroxymethane sulfinate 2 hydrate by a plunger pump to start the reaction. The pressure decreases as the reaction progresses and this decrease in pressure was compensated by adding ethylene. The reaction was conducted at a constant temperature and pressure (15° C., 2.1 MPaG) for 10 hours.

After the reaction was finished, the remaining monomers were released into the air and the obtained emulsified dispersion body was coagulated with hydrochloric acid, then washed with ion exchanged water and dried at 120° C. until a constant weight was reached to obtain 723 g of the elastomeric polymer product. The average polymerization rate was 25.3 g/hr/liter-water.

The composition of copolymer, number average molecular weight and weight average molecular weight of the product obtained by the polymerization were measured by the analyzing method of $^1$H-NMR and GPC. The product was a copolymer of 62.3% by mole of ethylene and 37.7% by mole of HFP, the number average molecular weight was $6.2 \times 10^4$ (on a polystyrene basis), and the weight average molecular weight was $2.74 \times 10^5$.

Furthermore, the Mooney viscosity (ML 1+10, 100° C.) measured by the following method was 66.

(Mooney viscosity (1+10, 100° C.))

The Mooney viscosity was measured according to ASTM-D1646 and JIS K6300.

Measurement instrument: Automatic Mooney viscosity meter made by Ueshima Seisakusho Co., Ltd.

Rotation number of rotor: 2 rpm

Measurement temperature: 100° C.

EXAMPLES 14 TO 16

E-HFP copolymer was obtained by emulsion polymerizing ethylene and HFP in the same manner as in Example 13 except that the amount of iron (II) sulfate 7 hydrate and disodium ethylene diamine tetraacetate 2 hydrate and the reaction time were as indicated in Table 2.

The amount of the copolymer obtained, the average polymerization rate, the composition of the copolymer, the number average molecular weight, the weight average molecular weight and the Mooney viscosity (ML 1+10, 100° C.) in these Examples are indicated in Table 2.

TABLE 2

|  | Ex. 13 | Ex. 14 | Ex. 15 | Ex. 16 |
| --- | --- | --- | --- | --- |
| Amount of iron sulfate (g) | 0.186 | 0.093 | 0.048 | 0.005 |
| EDTA-2Na2H$_2$O (g) | 0.249 | 0.124 | 0.064 | 0.006 |
| Polymerization time (hr) | 10 | 17 | 20 | 74 |
| Average polymerization rate (g/hr/liter-water) | 25.3 | 14.4 | 11.9 | 2.5 |
| Amount of copolymer obtained (g) | 723 | 730 | 749 | 576 |
| Molecular weight (× 10$^4$) |  |  |  |  |
| Number average | 6.2 | 9.91 | 12.05 | 21.64 |
| Weight average | 27.4 | 37.8 | 63.1 | 77.44 |
| Mooney viscosity (1 + 10, 100° C.) | 64 | 75 | 98 | 148 |
| Composition of copolymer (E/HFP: % by mole) | 62.3/37.7 | 62.6/37.4 | 63.2/36.8 | 62.5/37.5 |

EXAMPLE 17

A 100 ml stainless steel autoclave was charged with 45 ml of ion exchanged water, 42.5 g of ammonium perfluorooctanate, 0.04 g of sodium hydroxide, 0.4 g of disodium hydrogen phosphate 12 hydrate, 1.84 g of t-butyl alcohol and 0.13 g of Perbutyl PV (containing 70% by weight of t-butyl peroxy pivalate, available from NOF Corporation). After sufficiently replacing with nitrogen, the autoclave was charged with 16.7 g of hexafluoropropylene (HFP) and then 2.02 g of ethylene in a vacuum state. The autoclave was placed into a constant temperature water bath shaker of 5° C. and was shaken until the pressure became constant (1.6 MPaG). When the pressure became constant, the autoclave was charged with an aqueous solution containing 0.0031 g of iron (II) sulfate 7 hydrate, 0.0041 g of disodium ethylene diamine tetraacetate 2 hydrate and 0.1 g of sodium hydroxymethane sulfinate 2 hydrate by a plunger pump to start the reaction. The reaction was conducted at 5° C. for 1 hour.

After the reaction was finished, the remaining monomers were released into the air and the obtained emulsified dispersion body was coagulated with hydrochloric acid, then washed with ion exchanged water and dried at 120° C. until a constant weight was reached to obtain 0.8 g of the elastomeric polymer product. The average polymerization rate was 15.2 g/hr/liter-water.

The composition of copolymer, number average molecular weight and weight average molecular weight of the product obtained by the polymerization were measured by the analyzing method of $^1$H-NMR and GPC. The product was a copolymer of 60.1% by mole of ethylene and 39.9% by mole of HFP, the number average molecular weight (on a polystyrene basis) was 4.36×10$^4$, and the weight average molecular weight was 8.83×10$^4$.

EXAMPLE 18

3.7 g of E-HFP copolymer was obtained by emulsion polymerizing ethylene and HFP in the same manner as in Example 17 except that the polymerization temperature was set to 25° C. The average polymerization rate was 73.8 g/hr/liter-water.

The composition of copolymer, number average molecular weight and weight average molecular weight of the product obtained by the polymerization were measured by the analyzing method of $^1$H-NMR and GPC. The product was a copolymer of 58.6% by mole of ethylene and 41.4% by mole of HFP, the number average molecular weight (on a polystyrene basis) was 4.10×10$^4$, and the weight average molecular weight was 8.12×10$^4$.

EXAMPLE 19

A 3 l stainless steel autoclave was charged with 1.5 l of ion exchanged water, 75 g of ammonium perfluorooctanate, 1.2 g of sodium hydroxide, 11.8 g of disodium hydrogen phosphate 12 hydrate, 55.2 g of t-butyl alcohol and 3.68 g of Perbutyl PV (containing 70% by weight of t-butyl peroxypivalate, available from NOF Corporation). After sufficiently replacing with nitrogen, the autoclave was charged with 826 g of hexafluoropropylene (HFP) in a vacuum state and the temperature was set to 15° C. Then 26 g of an ethylene/TFE monomer mixture (87.7/12.3% by mole) mixed in advance was press fitted until the pressure within the autoclave reached 0.85 MPaG. The autoclave was left until the temperature was 15° C. and the pressure became constant (0.85 MPaG) while stirring the polymerization system with an electromagnetic stirrer. When the temperature and the pressure became constant, an aqueous solution obtained by dissolving 0.018 g of iron (II) sulfate 7 hydrate, 0.021 g of disodium ethylene diamine tetraacetate 2 hydrate and 2.9 g of sodium hydroxymethane sulfinate 2 hydrate into 50 g of ion exchanged water was subjected to bubbling by nitrogen gas and the autoclave was then charged with this solution by a plunger pump to start the reaction.

The pressure decreases as the reaction progresses and this decrease in pressure was compensated by adding ethylene/TFE monomer mixture (91.7/8.3% by mole). The reaction was conducted at a constant temperature and pressure (15° C., 0.85 MPaG) for 31.25 hours.

After the reaction was finished, the remaining monomers were released into the air and the obtained emulsified dispersion body was coagulated with hydrochloric acid, then washed with ion exchanged water and dried at 120° C. until a constant weight was reached to obtain 330 g of the elastomeric polymer product. The average polymerization rate was 7 g/hr/liter-water.

The composition of this E-HFP-TFE copolymer was measured by the analyzing method of $^1$H-NMR and $^{19}$F-NMR, and the number average molecular weight and weight average molecular weight of this E-HFP-TFE copolymer were measured by the analyzing method of GPC. The product was a copolymer of 54.0% by mole of ethylene, 40.4% by mole of HFP and 5.6% by mole of TFE, the number average molecular weight (on a polystyrene basis) was 44000, and the weight average molecular weight was 62000.

COMPARATIVE EXAMPLE 1

A 2 l stainless steel autoclave was charged with 887 ml of ion exchanged water, 444 g of ammonium perfluorooctanate. After sufficiently replacing with nitrogen, the autoclave was charged with 544 g of hexafluoropropylene (HFP) and then 70 g of ethylene in a vacuum state. The autoclave was heated by a circulating constant temperature bath and was left until the temperature reached 65° C. and the pressure became constant (6.0 MPaG) while stirring the polymerization system with an electromagnetic stirrer. The autoclave was then charged with 0.27 g of ammonium persulfate by a plunger pump to start the reaction. The pressure decreases as the reaction progresses and this decrease in pressure was compensated by adding ethylene. The polymerization reaction was conducted at a constant temperature and pressure (65° C., 6.0 MPaG) for 25 hours.

After the reaction was finished, the remaining monomers were released into the air and the obtained emulsified dispersion body was coagulated with hydrochloric acid, then washed with ion exchanged water and dried at 120° C. until a constant weight was reached to obtain 294 g of the elastomeric polymer product. The average polymerization rate was 15.4 g/hr/liter-water.

The composition of copolymer, number average molecular weight and weight average molecular weight of the product obtained by the polymerization were measured by the analyzing method of $^1$H-NMR and GPC. The product was a copolymer of 64.0% by mole of ethylene and 36.0% by mole of HFP, the number average molecular weight (on a polystyrene basis) was $1.08 \times 10^5$, and the weight average molecular weight was $9.12 \times 10^5$.

EXAMPLES 20 TO 24 AND COMPARATIVE EXAMPLE 2

The elastomeric E-HFP copolymer prepared respectively in Examples 12 to 16 and Comparative Example 1 was used. To 100 parts by weight (hereinafter "parts") of the copolymer were added 30 parts by weight of carbon black (MT-C), 3.7 parts of peroxide type vulcanizing agent (Perbutyl Z), 2.5 parts of auxiliary vulcanizing agent (triallylisocyanate, available from Nippon Kasei Chemical Co., Ltd.) and 3 parts of acid acceptor (MgO). Kneading was then conducted at room temperature using an open roll. All of the compounds had good adhesion to the roll and kneading was easy. The obtained rubber compound was put in a die, primarily vulcanized by press vulcanization and then secondarily vulcanized by oven vulcanization to prepare the vulcanizate. The vulcanization properties at 160° C. were measured. The results are shown in Table 3.

The properties under normal conditions and heat resistance of the obtained vulcanizate were measured by the following method. The results are shown in Table 3.

(Vulcanization Properties)

During primary press vulcanization, the vulcanization curve at 160° C. was obtained using a JSR-model Curastometer II. From this curve, the minimum viscosity (ML), vulcanization degree (MH), induction period ($T_{10}$) and optimum vulcanization time ($T_{90}$) were obtained.

(Properties Under Normal Conditions)

100% modulus (M100), tensile strength at break (TB) and tensile elongation at break (EB) were measured according to JIS K6251 (1993) and hardness (Hs) was measured by the durometer type A described in JIS K6253 (1997).

(Heat Resistance)

The rate of change in tensile strength at break ($\Delta$TB), the rate of change in tensile elongation at break ($\Delta$EB) and the rate of change in hardness ($\Delta$Hs) after 230° C.×72 hours of exposure in the air was measured.

EXAMPLE 25

The elastomeric E-HFP-TFE copolymer prepared in Example 19 was used. To 100 parts by weight (hereinafter "parts") of the copolymer were added 30 parts by weight of carbon black (MT-C), 3.7 parts of peroxide type vulcanizing agent (Perbutyl Z) and 2.5 parts of auxiliary vulcanizing agent (triallylisocyanate, available from Nippon Kasei Chemical Co., Ltd.). Kneading was then conducted at room temperature using an open roll. The compound had good adhesion to the roll and kneading was easy. The obtained rubber compound was put in a die, primarily vulcanized by press vulcanization and then secondarily vulcanized by oven vulcanization to prepare the vulcanizate. The vulcanization properties at 160° C. were measured. The results are shown in Table 3.

The properties under normal conditions and heat resistance of the obtained vulcanizate composition were measured. The results are shown in Table 3.

TABLE 3

|  | Ex. 20 | Ex. 21 | Ex. 22 | Ex. 23 | Ex. 24 | Ex. 25 | Com. Ex. 2 |
| --- | --- | --- | --- | --- | --- | --- | --- |
| Copolymer used | Ex. 12 | Ex. 13 | Ex. 14 | Ex. 15 | Ex. 16 | Ex. 19 | Com. Ex. 1 |
| Mooney viscosity (1 + 10, 100° C.) | 206 | 66 | 75 | 98 | 148 | 138 | 77 |
| Vulcanization (160° C.) | | | | | | | |
| ML | 0.9 | 0.2 | 0.4 | 0.4 | 0.5 | 0.3 | 0.35 |
| MH | 4.95 | 3 | 3.5 | 3.75 | 4.75 | 2.7 | 3.4 |
| $T_{10}$ | 0.3 | 0.3 | 0.4 | 0.3 | 0.2 | 0.4 | 0.3 |
| $T_{90}$ | 2.5 | 2.5 | 4 | 3.1 | 3.7 | 3.5 | 2.5 |
| Properties under normal condition | | | | | | | |
| M100 | 84 | 59 | 60 | 67 | 75 | 48 | 80 |
| TB | 254 | 186 | 216 | 230 | 255 | 183 | 154 |
| EB | 220 | 200 | 230 | 220 | 220 | 260 | 170 |
| Hs | 70 | 70 | 70 | 71 | 71 | 71 | 69 |
| Heat resistance (230° C. × 72 hr) | | | | | | | |
| $\Delta$TB (%) | −42.5 | −44.9 | −40.2 | −45.9 | −43.8 | −25 | −51.6 |
| $\Delta$EB (%) | −15.7 | −12.7 | −11.6 | −12.7 | −8.7 | 40.1 | −37.3 |
| $\Delta$Hs (%) | 1 | −2 | −1 | −1 | −2 | 0 | 2 |

INDUSTRIAL APPLICABILITY

According to the present invention, ethylene, HFP and when in demand, a monomer copolymerizable therewith can be emulsion polymerized at a low temperature of −20° C. to 40° C. at a high polymerization rate. Furthermore, the obtained elastomeric E-HFP copolymer has few branches and is excellent in processability.

Also, as mentioned before, the obtained vulcanizate has excellent heat resistance, oil resistance, amine resistance and chemical resistance and can be used for various parts in the automobile, aircraft and semiconductor industries. Utilizing this heat resistance, oil resistance and amine resistance, the vulcanized composition is particularly suitable for oil seal or oil seal parts such as a hose for the engine oil, ATF oil, gear oil and CVT oil of an automobile.

What is claimed is:

1. A process for preparing an elastomeric ethylene-hexafluoropropylene copolymer, which comprises emulsion-polymerizing ethylene, hexafluoropropylene, and when in demand, a monomer copolymerizable therewith in an aqueous medium at −20° C. to 40° C. using a redox type initiator.

2. The process of claim 1, wherein said copolymerizable monomer is a fluorine-containing olefin.

3. The process of claim 2, wherein said fluorine-containing olefin is selected from the group consisting of tetrafluoroethylene, vinylidene fluoride, chlorotrifluoroethylene, trifluoroethylene, pentafluoropropylene and perfluoro(alkyl vinyl ether), or at least two members of the monomers.

4. The process of claim 1, wherein copolymerization is conducted in the presence of a redox type initiator by using a radical polymerization initiator and a reducing agent comprising metal ion, hydroxymethane sulfinate and ethylenediaminetetraacetic acid or a salt thereof.

5. The process of claim 4, wherein said metal ion is an iron ion.

6. The process of claim 4, wherein said radical polymerization initiator is an organic peroxide or persulfate.

7. The process of claim 6, wherein said organic peroxide is a peroxyester.

8. The process of claim 7, wherein said organic peroxide is t-butyl peroxypivalate.

9. The process of claim 1, wherein emulsion polymerization is conducted under a polymerization pressure of 0.49 to 10 MPaG.

* * * * *